United States Patent
Wu

(10) Patent No.: US 6,558,039 B2
(45) Date of Patent: May 6, 2003

(54) LINEAR GUIDE WAY

(75) Inventor: Ching-Shan Wu, Miaoli (TW)

(73) Assignee: Hiwin Technologies Corp. (TW)

( * ) Notice: Subject to any disclaimer, the term of this patent is extended or adjusted under 35 U.S.C. 154(b) by 0 days.

(21) Appl. No.: 09/859,406

(22) Filed: May 18, 2001

(65) Prior Publication Data

US 2002/0021847 A1 Feb. 21, 2002

(30) Foreign Application Priority Data

May 24, 2000 (TW) .................................. 89109980 A

(51) Int. Cl.[7] .............................................. F16C 29/06
(52) U.S. Cl. ....................................................... 384/45
(58) Field of Search .............................. 384/43, 44, 45, 384/49

(56) References Cited

U.S. PATENT DOCUMENTS

| | | | | |
|---|---|---|---|---|
| 4,974,971 A | * | 12/1990 | Tanaka | 384/43 |
| 5,102,235 A | * | 4/1992 | Mugglestone | 384/43 |
| 5,265,963 A | * | 11/1993 | Kawaguchi | 384/43 |
| 5,295,748 A | * | 3/1994 | Yamazaki | 29/898.03 |
| 5,340,219 A | * | 8/1994 | Agari | 384/15 |
| 5,435,649 A | * | 7/1995 | Kuwahara | 384/13 |
| 6,106,154 A | * | 8/2000 | Agari | 384/13 |
| 6,170,986 B1 | * | 1/2001 | Hsu et al. | 384/13 |
| 6,200,031 B1 | * | 3/2001 | Faulhaber et al. | 384/45 |
| 6,210,040 B1 | * | 4/2001 | Mischler | 384/45 |

* cited by examiner

*Primary Examiner*—Thomas R. Hannon
(74) *Attorney, Agent, or Firm*—Bacon & Thomas, PLLC

(57) ABSTRACT

A linear guide way structure. The structure utilizes spring strips to combine a sliding body assembly and end caps, instead of using screws or pins. The sliding body assembly and the end caps are combined together with an almost constant resilient force provided by the spring strips whose mechanical strength is greater than that of plastic material. The problem of exfoliation between two physically different materials such a metal and plastic never is avoided. Accordingly, the linear guide way is easy to fabricate, operate, and maintain with low cost.

13 Claims, 4 Drawing Sheets

LINEAR GUIDE WAY

BACKGROUND OF THE INVENTION

1. Field of the Invention

The present invention relates to a linear guide way and, more particularly, to a linear guide way in which a slide block is installed without using any screws with the result that a preferable improvement can be expected for the structure of a smaller sized linear guide way.

2. Description of the Prior Art

FIG. 6 shows a conventional linear guide way. As shown in FIG. 6, the conventional linear guide way comprises a rail 1, a sliding block 2, two end caps 3, two guide plates 4, and two oil scrapers. The end caps 3, the guide plates 4, and the oil scrapers 5 are engaged to the sliding block 2 with screws 6. Several attachment holes 12 and several screw holes 22 are respectively formed on the rail 1 and the sliding block 2. The attachment holes 12 are used to fix the rail 1 on the main structure. On the other hand, the screw holes 22 are used for assembling the slide block 2 with the structure. As the size of the sliding block 2 becomes smaller, the size of the screws 6 becomes smaller accordingly. When the size of the screws 6 is minimized to a certain degree, the manufacturing of the screws 6 becomes more difficult. As a result, utilizing the screws for assembling a linear guide way as shown in FIG. 6 is difficult and unable to pay in case of constructing a tiny linear guide way.

FIG. 7 shows a schematic view of a recently patented structure for a linear guide way (U.S. Pat. No. 6,042,269). In this invention the guide plates 4 and the sliding block 2 are fixedly conjoined together by ejection process. Two stop pins 31 are provided for each end cap 3. On the other hand, two insertion holes 41 are formed for each guide plate 4. When assembling the end cap 3 with the guide plates 4, the stop pin 31 is inserted into the insertion hole 41 and engaged with each other. The innovative improvement was made such that the stop pin 31 has an enlarged pin head 311, while an aperture 42 is formed on each side of the guide plate 4. When separating the end cap 3 and the guide plate 4, the pin head 311 is previously pressed to shrink by inserting a tool from the aperture 42 so as to facilitate extraction of the stop pin 31 and separation of end cap 3 and the guide plate 4. With this structure, the embarrassing problem in utilization of screws in a small sized linear guide way is overcome, and the production cost is reduced. However, there arises four new problems. First, after having been completed grinding process, the sliding block 2 has to go through a forming process by ejection under temperature of 150~200° C. that reaches the annealed temperature of steel material very likely to cause change of metallic phase and material deformation. As a result, a final finishing accuracy of the product will be degraded. Second, during ejection process for forming the guide plate 4 and the sliding block 2 in an integral piece. It is well known that the thermal expansion coefficient of plastic for forming the guide plate 4, is approximately $(7\sim10)\times10^{-5}$, while that of alloy steel for forming the sliding block 2 is approximately $1\times10^{-5}$. The difference between the two ranges is as large as to 7~10 times. Disintegration between plastic and steel will definitely occur not long after operation owing to repeated thermal stress resulting in unrepairable failure of the linear guide way. Third, the allowable necessary clearance existing between the stop pin 31 and both end caps 3 and guide plates 4 will exacerbate loosening of engagement between the end cap 3 and the guide plate 4 by constant impact of circulating steel balls against the end cap 3 when the sliding block 2 is moving fast. Fourth, although the aperture 42 is provided for facilitating extraction of the stop pin 31, an extra tool is required.

SUMMARY OF THE INVENTION

The present invention has thus been made in order to eliminate the inconvience inherent to the two conventional techniques as mentioned above.

In the present invention, spring strips are employed for engaging the end cap and the sliding block instead of screws and pins. As a matter of fact, the loading force of the screws in a linear guide way is not great. The force of the end caps which depends on the screws to support is an impact force exerted by steel balls turning their direction during circulation and is nothing to do directly with the load of the linear guide way. Actually, the force which the end caps have to withstand is influenced by the force generated from moving speed of the sliding block in the linear guide way, but this force is quite small compared to the load of the linear guide way. The resilient force of spring strips is enough to cope with this force for engaging the end caps with the sliding block instead of using screws.

It is a common sense that deformation of a spring affects its resiliency, but a minor deformation will by no means cause a severe fatigue of elasticity, which greatly reduces the resilient force of a spring. Therefore, the end caps and the sliding block can be reliably combined together without the fear of loosening during the life span.

In the present invention, the plastic end caps are attached to the metallic slide block with a constant spring force without employing any binding means so that the problem of exfoliation between metallic part and plastic part never occurs as that is always experienced in conventional techniques. Moreover, a tedious ejection process for combining the plastic end caps with the metallic slide block as that must be carried out in the cited case (U.S. Pat. No. 6,042,269) is eliminated thereby further evading the problem of disintegration of the two parts due to thermal stress as mentioned above.

In the present invention, a gripping angle and a guiding angle are formed at each side of the spring strip into gripping fissure formed in the end cap so as to forcibly conjoin the end cap with the sliding block. With such means of conjoining the end cap and the sliding block by the spring force employed in the present invention has solved the problem of difficulty in extracting the stop pin, and this problem has been embarrassing the aforesaid cited case. The spring strip of the present invention can be easily dug up with a common screw driver in case of detaching the end cap from the sliding block.

In the present invention, the metallic spring strip whose mechanical strength is far greater than that of plastic material is used to conjoin the end cap with the sliding block and is embraceably mounted at the position where being susceptible to structural deformation due to material deterioration and abrupt variation of environmental condition such as temperature and moisture so as to minimize rate of failure of the linear guide way.

BRIEF DESCRIPTION OF THE DRAWINGS

To enable a further understanding of the innovative and technological content of the invention herein, refer to the detailed description of the invention and the accompanying brief description of the drawings appended below. Furthermore, the attached drawings are provided for purposes of reference and explanation and shall not be construed as limitations applicable to the invention herein.

DETAILED DESCRIPTION OF THE PREFERRED EMBODIMENT

Figure 1:
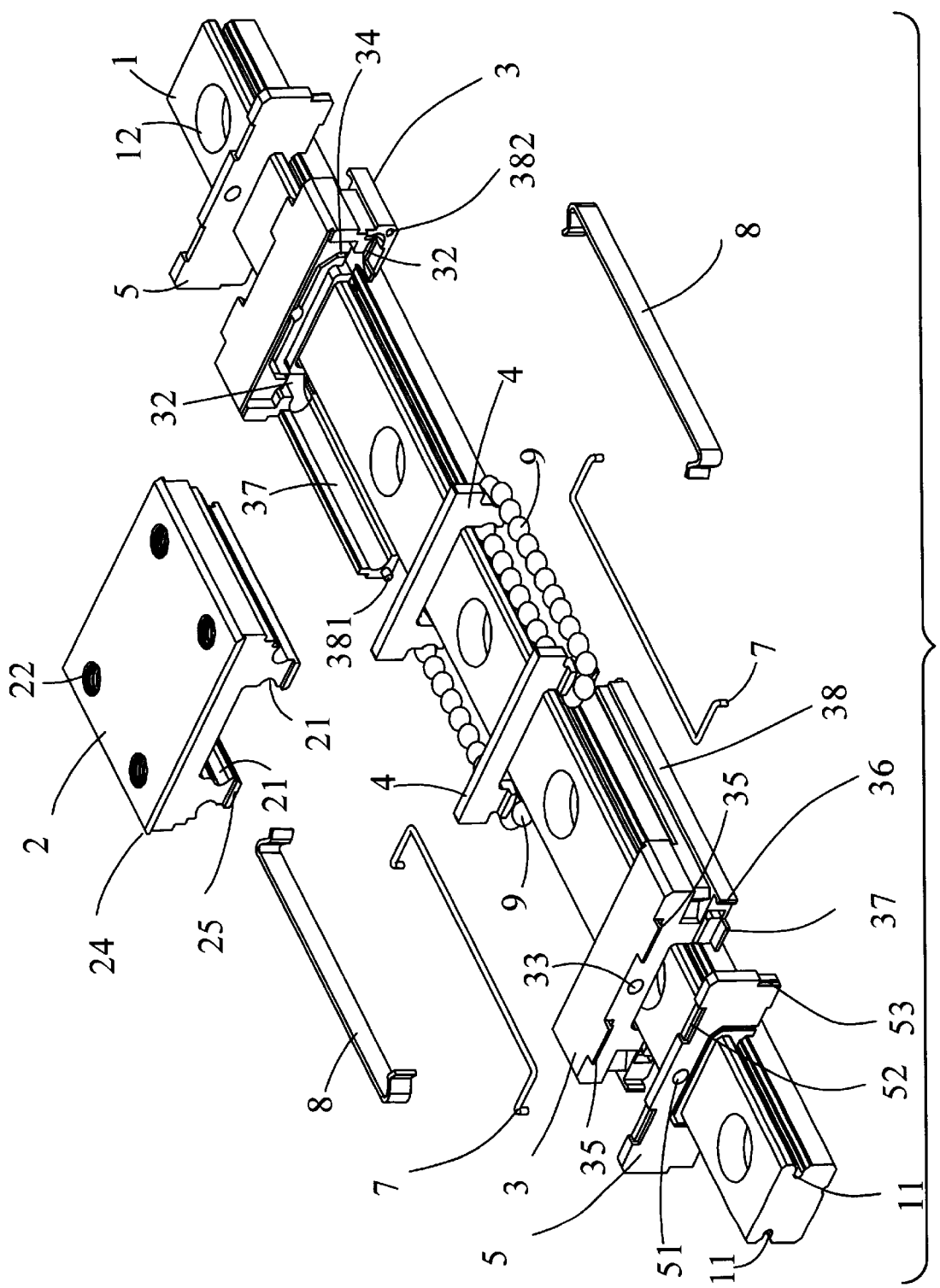
FIG. 1 is an assembly view of a linear guide way of the present invention.

FIG. 1 is an assembly view of a linear guide way of the present invention, as shown in FIG. 1, it comprises a rail 1 and a sliding body assembly which is composed of a sliding block 2, two end caps 3, two guide plates 4, two oil scrapers 5, two ball holders 7, and two spring strips 8 embracing the sliding block 2 from its front and rear ends to conjoin related component parts together. Several attachment holes 12 and several screw holes 22 are respectively formed on the rail 1 and the sliding block 2. The attachment holes 12 are for fixing the rail 1 on the structural framework of the linear guide way, while the screw holes 22 are for attaching the sliding block 2 thereon. A ball circulation groove 11 is formed longitudinally along each side of the rail 1, on the other hand, another ball groove 21 coupling with its corresponding groove 11 is formed at each inner side of the sliding body 2. The cavity formed between the grooves 111 and 21 contains a plurality of steel balls 9 which are used to minimize frictional resistance between the moving sliding block 2 and the stationary rail 1. The guide plate 4 is installed at each end of the sliding block 2 for guiding the steel balls to circulate smoothly and orderly along the circulation pathway. The end cap 3 enclosing the guide plate 4, is attached to each end of the sliding block 2, and a ball circulation groove 32 is formed on each end cap 3. The ball circulation groove 32 and the guide plate 4 are combined to form a smooth circulation pathway for the steel balls. An oil nozzle fixing screw hole 33 for fixing an oil nozzle on the sliding block 2 and an oil way 34 for distributing lubricating oil appropriately to the sliding block 2 are formed on the end cap 3. In order to facilitate installation of the oil nozzle, a circular hole 51 is provided on the oil scraper 5 so that the oil nozzle is able to tunnel through the circular hole 51 and engaged to the screw hole 33. For carrying out screw less engagement, positioning flanges 37 are provided for the end cap 3 to determine an accurate position for assembling the oil scraper 5 with the end cap 3. The end cap 3 and the oil scraper 5 are coupled together by mating two tenons 35 and 36 formed on the end cap 3 to the corresponding mortise eyes 52 and 53 provided on the oil scraper 5. Engagement force between the tenons 35,36 and the mortise eyes 52,53 are sufficient to fix the oil scraper 5 at its position because it has only to withstand a force of scrabbing away wasted oil scale and dust remained on the rail 1. Furthermore, each side of the end cap 3 has an extension arm 38 equipped with a male protuberance 381, on the other hand, a corresponding female recess 382 is formed on the other end cap 3. When assembling the structure, the male protuberance 381 on one end cap 3 is mated with the female recess 382 of the other end cap 3.

Figure 2:
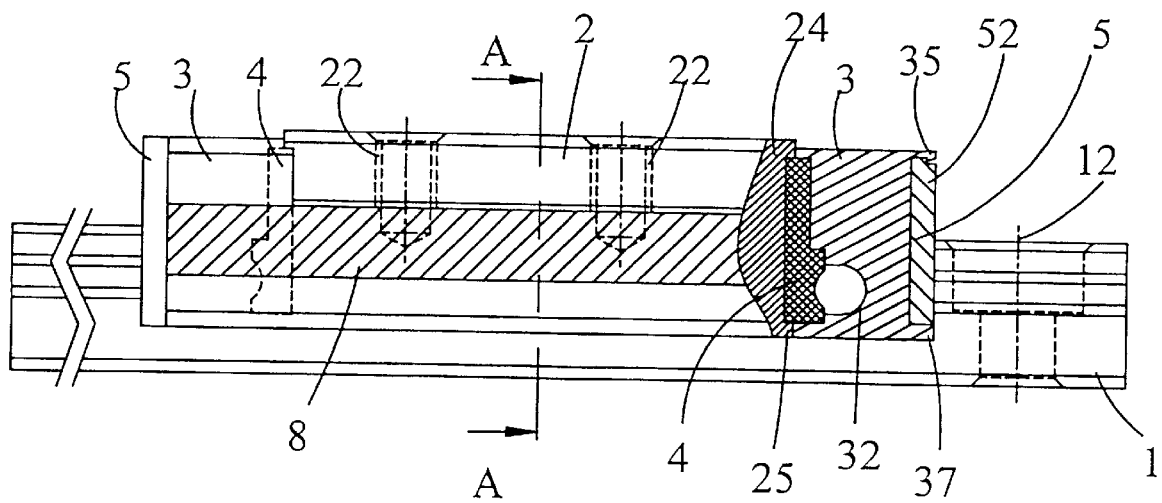
FIG. 2 is a front view of a linear guide way of the present invention.

In order to show clearly the construction of the present invention, the right portion of the slide block 2 in the front view shown in FIG. 2 is expressed in a cross sectional view. As shown in the cross sectional view, the guide plate 4 is enclosed by the sliding block 2 and the end cap 3; and the ball circulation groove 32 on the end cap 3 and the guide plate 4 are combined to form a U shaped circulation pathway for the steel balls; the attachment of the oil scraper 5 to the end cap 3 is performed by the positioning flange 37; the end cap 3 and the oil scraper 5 are conjoined together by the tenon 35 mated with the mortise eye 52. Besides, additional positioning flanges 24 and 25 are formed on the sliding body 2 for aligning the mutual positions accurately when assembling the sliding block 2, the end caps 3 and the guide plates 4 together.

Figure 3:
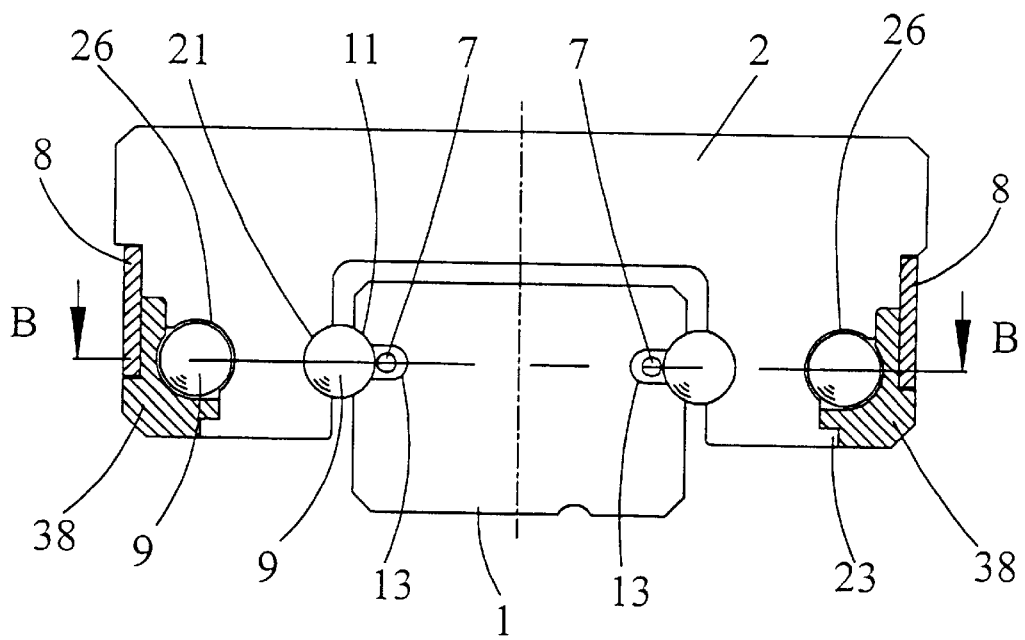
FIG. 3 is a cross sectional view cut along line A—A of FIG. 2.

FIG. 3 is a cross sectional view cut along line A—A of FIG. 2, wherein the construction of the ball grooves 11 and 21 is illustrated in the above description. There is further an asylum groove 13 formed at the bottom portion of the ball groove 11, the ball holder 7 is installed amidst of the asylum groove 13. When the sliding body assembly is separated from the rail 1, the steel balls 9 are also released from the ball groove 11. However, the balls 9 do not drop out from the sliding body assembly since they are confined by the asylum groove 13 and the holder 7. A ball circulation groove 26 is formed on the outer side of the sliding block 2. The ball circulation groove 26 and the extension arm 38 of the end cap 3 combine to provide a pathway for ball circulation. The spring strips 8 installed closely at the outer sides of the extension arms 38 have a greater mechanical strength than that of plastic so that they are able to forcibly attach the extension arms 38 on the sliding block 2 thereby preventing the extension arms 38 to flex in the horizontal direction with respect to FIG. 3. Although the extension arm 38 has a greater sectional area in the vertical direction with respect to FIG. 3 so that the extension arm 38 is not susceptible to flexing in this direction. However, in order to intensify the mechanical strength of the extension arm 38 in this direction, an additional flange 23 can be formed on the sliding block 2. Meanwhile, in a small sized structure, this flange 23 is preferably omitted for saving space and facilitating production process since the relatively short extension arm 38 is not susceptible to flexing.

Figure 4:
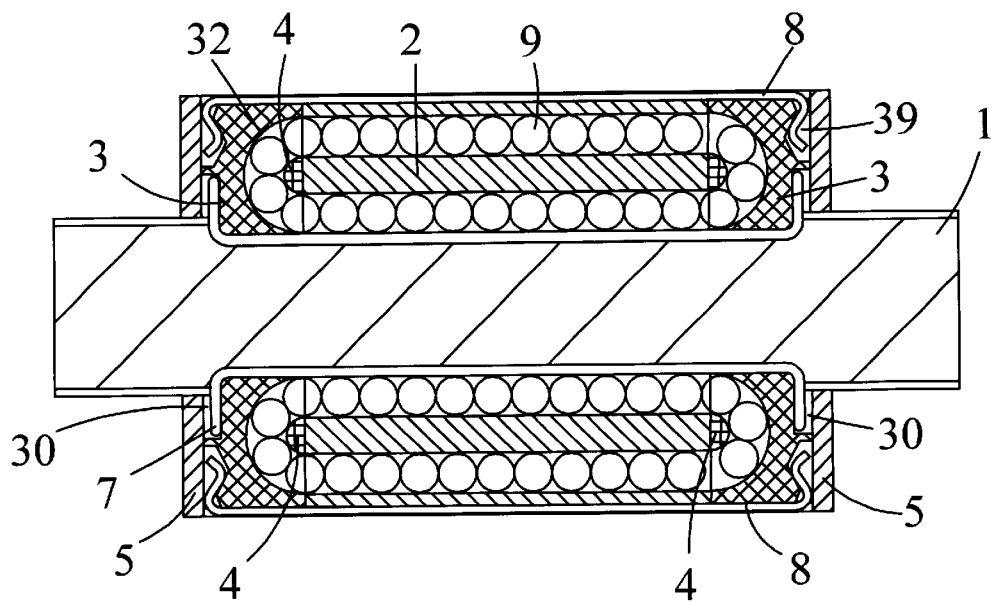
FIG. 4 is a cross sectional view cut along line B—B of FIG. 3.

FIG. 4 is a cross sectional view cut along line B—B of FIG. 3. As shown in FIG. 4, the ball circulation grooves 32 on the end cap 3 and the guide plate 4 are combined to form an arcuate pathway for the steel balls 9 to change the marching direction. If the size of the linear guide way is very small, the filleted corner of the pathway may function as the guide plate 4 so that the guide plate 4 may be omitted to save available space and facilitate production process. A gripping fissure 39 is formed in each end cap 3 for inserting the two flexed ends of the spring strip 8 so that the sliding block 2, end caps 3, and the guide plates 4 are forcibly and reliably combined together by the resilient force of the spring strips 8. The two ends of the ball holder 7 are fixed at each holding slot 30.

Figure 5:
FIG. 5 is a front view of the spring strip used in the present invention.
Figure 6:
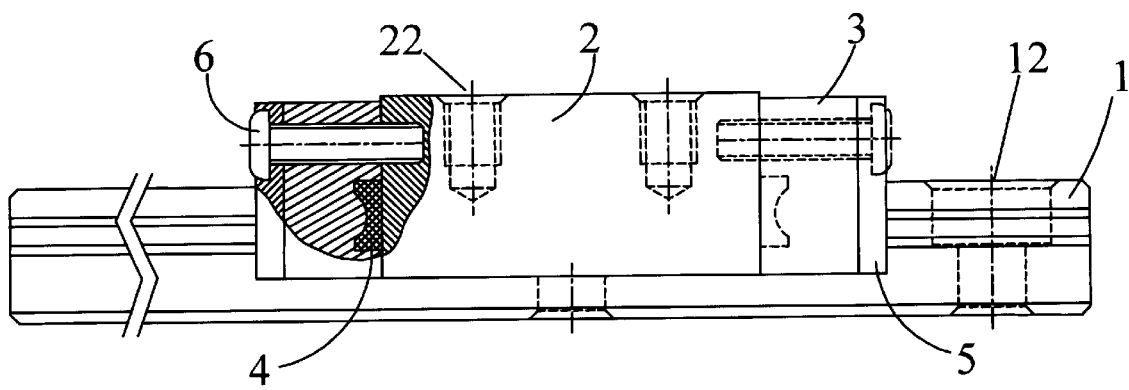
FIG. 6 is a top cross sectional view of a conventional linear guide way.
Figure 7:
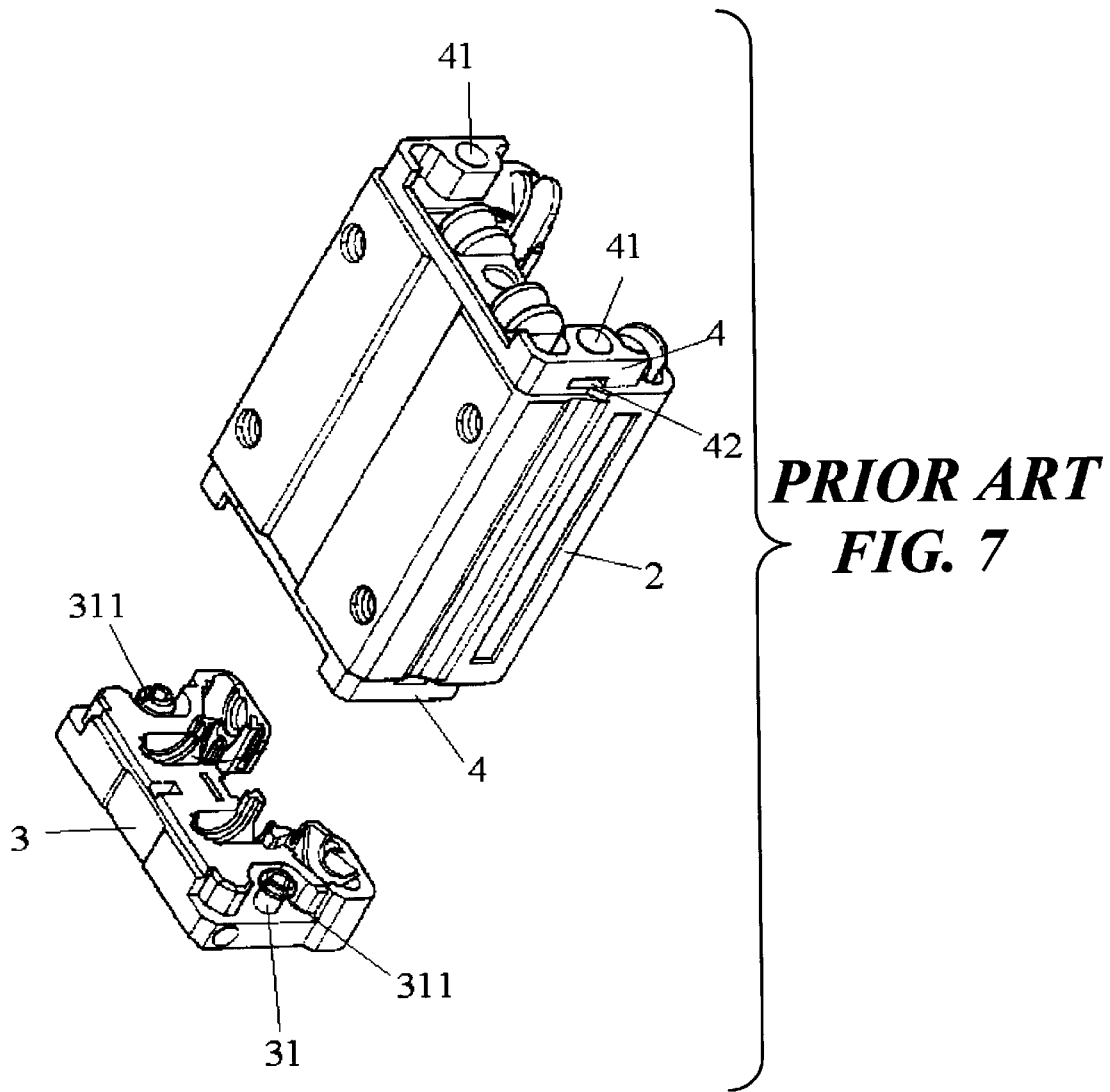
FIG. 7 is a three dimensional view of a linear guide way patented recently by U.S. Pat. No. 6,042,269.

FIG. 5 is a front view of the spring strip 8. The two ends of the string strip 8 are flexed to form a gripping angle α and a guide angle β. The angle α can provide a resilient force to engage the end cap 3 and the sliding body 2 together, and prevent occurrence of clearance therebetween. On the other hand, the angle β is for guiding the ends of the spring strip 8 to be forcibly pressed into the gripping fissures 39 formed in the two end caps 3 fixing them. The angle α also has a guiding effect to release the end of the spring strip 8 in the case of detaching the structure. The spring strip 8 can be easily dug up from the gripping fissures 38 by inserting a common screw driver between the spring strip 8 and the sliding block 2 when detaching the structure.

Those who are skilled in the art will readily perceive how to modify the invention. Therefore, the appended claims are to be construed to cover all equivalent structures which fall within the true scope and spring of the invention.

What is claimed is:

1. A linear guide way comprising;
   a rail with limited length having a pair of parallel long ball grooves formed respectively two along outer sides of said rail;
   a sliding block having a pair of sliding ball circulation grooves at inner sides thereof correspondingly coupled with said long ball circulation grooves formed along the outer sides of said rail;
   a plurality of steel balls accommodated in a cavity formed between each pair of corresponding ones of the long ball grooves and the sliding ball circulation grooves;
   two end caps attached to said sliding block at both ends facing to the extending direction of said rail, each of said end caps having a cap ball circulation groove with an inner diameter slightly greater than that of said steel balls;
   two spring strips each having two flexed ends and a middle portion parallel to said rail, said spring strips conjoin said two end caps with said sliding block by embracing them with said two flexed ends gripping respectively on said two end caps; and
   two ends of each of the spring strips each includes a gripping angle portion and a guide angle portion, the gripping angle portions provide a resilient force to engage together respective ones of the end caps and the sliding body, and the guide angle portions are configured to guide ends of respective ones of the spring strips to be forcibly pressed into gripping fissures formed in the end caps, and inwardly formed angles between the gripping angle portions and longitudinal portions of respective ones of the spring strips are acute.

2. The linear guide way of claim 1, wherein said two spring strips are disposed respectively along two longitudinal sides of said sliding block parallel to each other.

3. The linear guide way of claim 1, wherein a guide plate is interposed between said end cap and said sliding block, said guide plate and said ball circulation grooves of said end cap are combined to form a U shaped circulation pathway for the steel balls.

4. The linear guide way of claim 1, wherein an asylum groove is formed at a bottom of said long ball circulation groove of said rail.

5. The linear guide way of claim 4, wherein a ball holder is installed amidst of said asylum groove, both ends of said ball holder are fixed to said end caps.

6. The linear guide way of claim 1, wherein an oil scraper is installed at the outer side of each of said end caps.

7. The linear guide way of claim 6, wherein two tenons are formed on said end cap, and corresponding mortise eyes are provided on said oil scraper, said oil scraper is engaged to said end cap by mating said tenons to said mortise eyes.

8. The linear guide way of claim 1, wherein each of said end caps has an extension arm at one side thereof for coupling with outer side of said sliding block.

9. The linear guide way of claim 8, wherein the terminal of said extension arm is equipped with a male protuberance.

10. The linear guide way of claim 8, wherein an additional flange is formed on the mating surface of said sliding block and said extension arm so as to intensify the mechanical strength of said extension arm not to flex.

11. The linear guide way of claim 8, wherein each of said spring strips is installed close to respective ones of said extension arm so as to protect said extension arms from deformation.

12. The linear guide way of claim 8, wherein said spring strip is installed near the ball circulation groove of said extension arm so as to intensify the mechanical strength of said ball circulation groove.

13. The linear guide way of claim 1, wherein positioning flanges are provided on said end cap for assembling an oil scraper with said end cap.

* * * * *